March 15, 1960 H. BLESS 2,928,503
FRICTION BRAKE FOR CATAPULTS
Filed Nov. 15, 1956
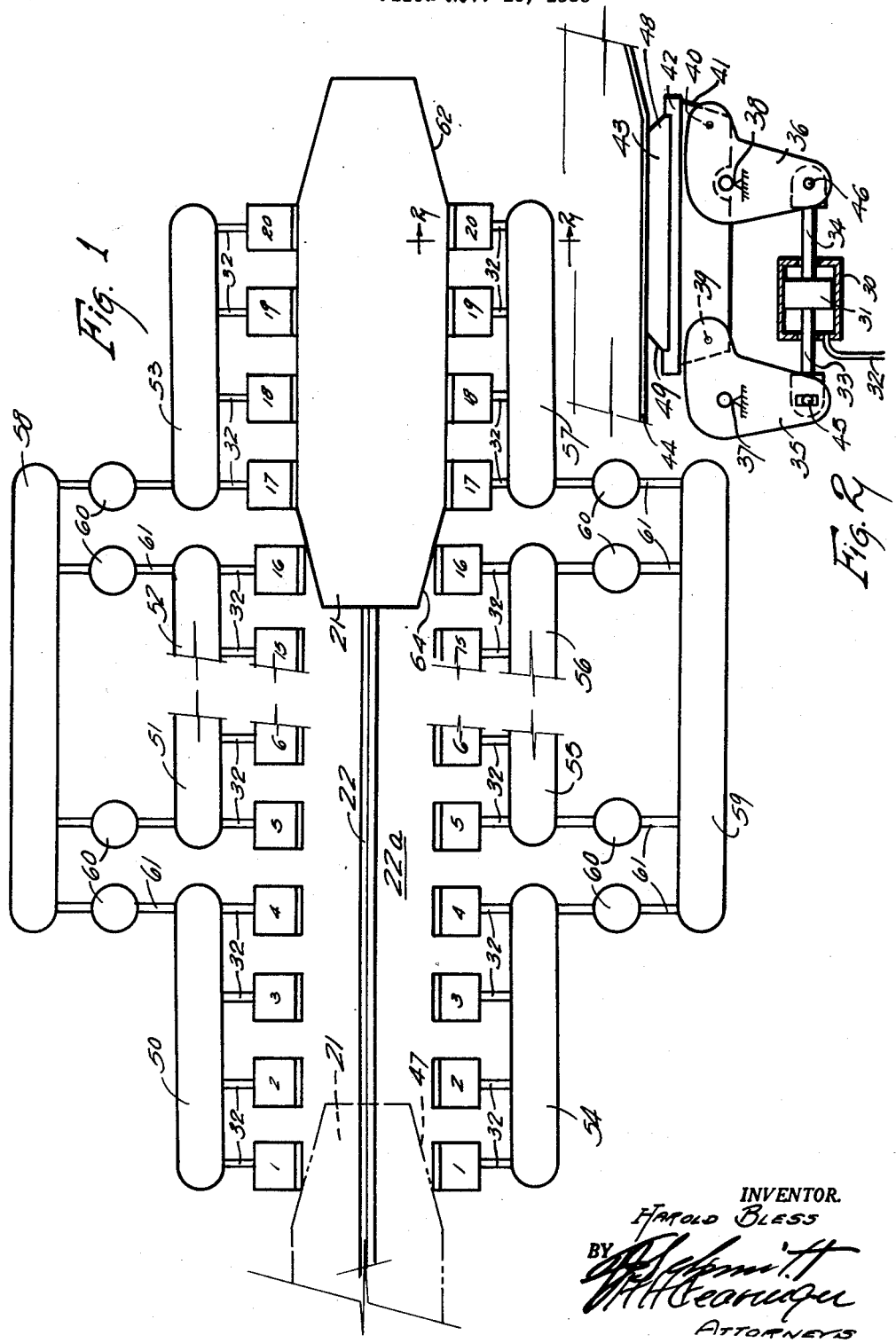
INVENTOR.
HAROLD BLESS
BY
ATTORNEYS

2,928,503
FRICTION BRAKE FOR CATAPULTS

Harold Bless, Philadelphia, Pa., assignor to the United States of America as represented by the Secretary of the Navy Application November 15, 1956, Serial No. 622,504

4 Claims. (Cl. 188—62)

(Granted under Title 35, U.S. Code (1952), sec. 266)

The invention described herein may be manufactured and used by or for the Government of the United States of America for governmental purposes without the payment of any royalties thereon or therefor.

This invention relates to a braking means for a shuttle or any other similar device wherein a fast moving object must be halted in a limited amount of space. The particular invention relates to a catapult shuttle braking means wherein limitations of runway or guide space are obvious on an airplane carrier.

Prior art systems for arresting or braking the shuttle utilized either (a) a reeved hydraulic brake, or (b) single or dual water brakes, or (c) buffers. With the reeved brake, the apparatus required is massive and the maximum catapult end speed is limited. The water brakes, due to their short strokes, impart a very high reaction load to the foundation as well as high deceleration forces to the shuttle piston and shuttle. The buffers also are massive in structure, provide high reaction loads to the foundation, and cannot withstand high end speeds.

The object of this invention, therefore, is a braking device which allows high end speeds of the shuttle.

Another object of this invention is a braking device which is relatively compact and is not of a massive design.

A further object of this invention is a device which brakes a catapult shuttle with a relatively constant deceleration.

A still further object of this invention is a braking device which does not impart high reaction loads to its foundation thereby eliminating the need of huge supports for the braking system.

These and other objects will be readily apparent to those skilled in the art from an examination of the following description and attached drawings wherein:

Figure 1 is a diagrammatic view of the shuttle and the braking assemblies, and

Figure 2 is a cross-sectional view of one of the friction brake assemblies.

Referring to Figure 1, a standard catapult shuttle 21 rides in a guide slot 22 in a launching platform 22a. Mounted on the platform parallel to the path of travel of the shuttle 21 and on both sides of the path area are a plurality of brake assemblies numbered 1–20. The number of such assemblies can vary, of course, as the number is determined by the size and velocity of the shuttle and the allocated design space for the braking mechanism.

Located adjacent to the assemblies are a plurality of pressure manifolds 50, 51, 52 and 53 on one side of the shuttle and 54, 55, 56 and 57 on the opposite side of the shuttle. Each manifold services four brake assemblies communicating with such assemblies via connecting branches or connecting conduits 32. Pressure sources 58, 59, as for example, a tank or a compressor, supply pressure fluid to each of the manifolds via branch conduits 61. Each conduit 61 has a pressure regulator 60 therein to reduce the manifold pressure to a specified design value.

Referring to Figure 2, each brake assembly consists of a brake shoe 41 having secured thereto a lining mounter 42 recessed to receive the brake lining 43. Each lining is beveled at its leading and trailing edges, 48 and 49, respectively, for a purpose hereinafter explained.

A pair of parallel bell-crank levers 35 and 36 are pivotally mounted on support structure at 37 and 38, respectively, and have a connection to the leading and trailing edge of the shoe as at 39 and 40; the opposite force points 45, 46 on the bell-crank levers 35 and 36, respectively, are connected to an air motor via connecting arms 33, 34. The motor consists of a housing 30, piston 31, and has one of the connecting conduits 32 leading into the housing to one side of the piston. The air pressure acting upon the face of piston 31 actuates arms 33, 34 thereby rotating levers 35, 36 about their respective pivot points forcing brake shoe 41 inwardly for a tighter engagement with shuttle 21.

A matching strip 44 is secured or made an integral part of shuttle 21 and is of a width commensurate with the width of the brake linings 43.

The leading and trailing edges 62 and 64, respectively, of the shuttle 21 are beveled at the same angle as the bevel at 48, 49 on the linings 43 to ease the high speed engagement and disengagement of the shuttle with each lining.

Operation

The pressure fluid, e.g. air, is permitted to enter each of the brake assemblies 1–20 via the connecting conduits and manifolds. In order to insure a constant deceleration of the shuttle, pressure regulators 60 are adjusted so that the pressure in each pair of facing manifolds, e.g. 50 and 54, is higher than the pressure in each succeeding pair, e.g. 51, 55. Each manifold services four brake assemblies.

Each of the brake assemblies is forced inwardly as determined by the pivoting of bell-cranks 35, 36. Each of the assemblies is now in the arresting position.

As the shuttle 21 travels along track 22 at a high speed, the attached airplane is launched and the shuttle is free; contact strip 44 then comes into braking engagement with each pair of opposing brake assemblies. The instant design is such that a maximum of 5 pairs of brake assemblies may come into strip contact with strips 44 on the shuttle 21. This number, of course, may be altered together with the contact pressures, depending upon the particular design, energy of shuttle, etc.

At the end of the stroke, the shuttle will have passed assembly pairs 1–15 and have lost most or all of its kinetic energy and will be brought to a halt. Retraction mechanism (not shown) engages shuttle 21 and returns it to its original firing position for another launching operation.

Obviously many modifications and variations of the present invention are possible in the light of the above teachings. It is therefore to be understood that within the scope of the appended claims the invention may be practiced otherwise than as specifically described.

What is claimed is:

1. A braking device for arresting the movement of a shuttle member adapted for movement in a predetermined direction along a predetermined path defined by a guide slot in a launching platform comprising a plurality of separately and individually actuated brake assemblies mounted on said launching platform on both sides of said guide slot, each of said separately and individually actuated brake assemblies on both sides of said guide slot including a support structure carried by said launching platform, a single pair of spaced bell-crank levers pivotally connected to said support structure, a brake shoe carried by said single pair of bell-crank levers and being movable substantially transversely of said path of movement of said shuttle member upon rotation of said bell-crank levers, a brake lining carried by said brake shoe and being movable thereby into braking engagement with said shuttle member upon a predetermined movement of said shoe and a fluid motor positioned between and directly connected to said pair of bell-crank levers for effecting the simultaneous rotation thereof, a plurality of manifolds for carrying pressurized fluid, conduit means connecting each of said fluid motors in each of said brake assemblies with one of said fluid pressure manifolds and being operable to supply each of said fluid motors in each of said brake assemblies with fluid under pressure, a plurality of fluid pressure sources, conduit means connecting each of said fluid pressure manifolds separately and individually to one of said fluid pressure sources, and regulator means carried in said conduit means separately and individually connecting each of said fluid pressure manifolds to one of said fluid pressure sources for selectively varying the pressure of the fluid supplied to successive predetermined numbers of said brake assemblies to thereby successively increase the braking action of said braking device as said shuttle member moves along said launching platform in said guide slot.

2. A braking device as claimed in claim 1 wherein each of said fluid pressure manifolds communicates by said conduit means with a predetermined number of fluid motors to thereby supply pressurized fluid to a predetermined number of said brake assemblies.

3. A braking device as claimed in claim 2 wherein said regulator means is comprised of a fluid pressure regulator carried in said conduit means separately and individually connecting each of said fluid pressure manifolds to one of said fluid pressure sources, said fluid pressure regulator carried in each of said conduit means being operable to maintain the fluid pressure in each manifold at a predetermined value.

4. A braking device as claimed in claim 1 wherein the edges of the brake lining in each of said brake assemblies are bevelled at a predetermined angle and wherein the leading and trailing edges of said shuttle member are bevelled at substantially the same predetermined angle, said bevelled edges on said brake linings and said shuttle member being operable to ease the engagement and disengagement of said shuttle member with said brake linings.

References Cited in the file of this patent

UNITED STATES PATENTS

| | | |
|---|---|---|
| 2,184,715 | Fromhart | Dec. 26, 1939 |
| 2,639,786 | Northrop et al. | May 26, 1953 |
| 2,728,538 | Mazis | Dec. 27, 1955 |

FOREIGN PATENTS

| | | |
|---|---|---|
| 316,150 | Great Britain | Mar. 27, 1930 |